(12) United States Patent
Sukthankar et al.

(10) Patent No.: US 11,010,948 B2
(45) Date of Patent: May 18, 2021

(54) AGENT NAVIGATION USING VISUAL INPUTS

(71) Applicant: GOOGLE LLC, Mountain View, CA (US)

(72) Inventors: Rahul Sukthankar, Berkeley, CA (US); Saurabh Gupta, Berkeley, CA (US); James Christopher Davidson, Alameda, CA (US); Sergey Vladimir Levine, Berkeley, CA (US); Jitendra Malik, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/485,140

(22) PCT Filed: Feb. 9, 2018

(86) PCT No.: PCT/US2018/017666
§ 371 (c)(1),
(2) Date: Aug. 9, 2019

(87) PCT Pub. No.: WO2018/148574
PCT Pub. Date: Aug. 16, 2018

(65) Prior Publication Data
US 2019/0371025 A1    Dec. 5, 2019

Related U.S. Application Data

(60) Provisional application No. 62/456,945, filed on Feb. 9, 2017.

(51) Int. Cl.
*G06T 11/60* (2006.01)
*G01C 21/32* (2006.01)
(Continued)

(52) U.S. Cl.
CPC .............. *G06T 11/60* (2013.01); *G01C 21/32* (2013.01); *G06K 9/00664* (2013.01);
(Continued)

(58) Field of Classification Search
CPC ....... G06T 7/20; G01C 21/32; G06K 9/00664
See application file for complete search history.

(56) References Cited

U.S. PATENT DOCUMENTS 7,835,820 B2 *  11/2010  Peters, II ............. G05D 1/0246
                                                        700/245
8,700,320 B1 *   4/2014  Teicher .............. G01C 21/3476
                                                        701/438
(Continued)

FOREIGN PATENT DOCUMENTS

CN           1389710          1/2003

OTHER PUBLICATIONS

EP Office Action in European Application No. 1875137.7, dated Jun. 23, 2020, 8 pages.
(Continued)

*Primary Examiner* — Ryan R Yang
(74) *Attorney, Agent, or Firm* — Fish & Richardson P.C.

(57) ABSTRACT

Methods, systems, and apparatus, including computer programs encoded on computer storage media, for navigation using visual inputs. One of the systems includes a mapping subsystem configured to, at each time step of a plurality of time steps, generate a characterization of an environment from an image of the environment at the time step, wherein the characterization comprises an environment map identifying locations in the environment having a particular characteristic, and wherein generating the characterization comprises, for each time step: obtaining the image of the environment at the time step, processing the image to generate a first initial characterization for the time step,
(Continued)

obtaining a final characterization for a previous time step, processing the characterization for the previous time step to generate a second initial characterization for the time step, and combining the first initial characterization and the second initial characterization to generate a final characterization for the time step.

21 Claims, 4 Drawing Sheets

(51) Int. Cl.
    *G06K 9/00*     (2006.01)
    *G06T 3/00*     (2006.01)
    *G06T 7/20*     (2017.01)

(52) U.S. Cl.
    CPC ............ *G06T 3/0093* (2013.01); *G06T 7/20* (2013.01); *G06T 2207/20084* (2013.01)

(56) References Cited

U.S. PATENT DOCUMENTS

| | | | | |
|---|---|---|---|---|
| 9,661,473 | B1* | 5/2017 | Jarvis | H04W 4/043 |
| 10,607,134 | B1* | 3/2020 | Cosic | G06N 3/084 |
| 2013/0211659 | A1* | 8/2013 | Peynot | G06K 9/00805 701/28 |
| 2013/0216098 | A1 | 8/2013 | Hasegawa et al. | |
| 2017/0157769 | A1* | 6/2017 | Aghamohammadi | G05D 1/0217 |
| 2017/0219364 | A1* | 8/2017 | Lathrop | G01C 21/3453 |
| 2018/0137367 | A1* | 5/2018 | Pavetic | G06K 9/00758 |
| 2020/0225673 | A1* | 7/2020 | Ebrahimi Afrouzi | G05D 1/0214 |

OTHER PUBLICATIONS

Abadi et al., "Tensor-Flow:Large-scale machine learning on heterogeneous systems", Tensor Flow, 2015, 19 pages.
Abel et al., "Exploratory gradient boosting for reinforcement learning in complex domains" arXiv, 2016, 8 pages.
Agrawal et al., "Pixels to voxels: modeling visual representation in the human brain" arXiv, 2014, 15 pages.
Armeni et al., "3D semantic parsing of large-scale indoor spaces" CVPR, 2016, 10 pages.
Aydemire et al., "Active visual object search in unkown enviroments using uncertain semantics" IEEE Transactions on Robotics, 29(4):986-1002, 2013, 17 pages.
Bellman, "A markovian decision process" Technical report, DTIC Document, 1957, 15 pages.
Bengio et al., "Scheduled sampling for sequence prediction with recurrent neural networks" Advances in Neural Information Processing Systems, pp. 1171-1179, 2015, 9 pages.
Bhatti et al., "Playing doom with slamaugmented deep reinforcement learning" arXiv, 2016, 9 pages.
Blundell et al., "Model-free episodic control" arXiv, 2016, 12 pages.
Brahmbhatt et al., "Deepnav: Learning to navigate large cities" arXiv, 2017, 10 pages.
Chen et al., "Deepdriving: Learning affordance for direct perception in autonomous driving" Proceedings of the IEEE International Conference on Computer Vision, pp. 2722-2730, 2015, 9 pages.
Daftly et al., "Learning transferable policies for monocular reactive mav control" arXiv, 2016, 9 pages.
Davison et al., "Mobile robot localisation using active vision" European Conference on Computer Vision, pp. 809-825, 1998, 17 pages.
Deng et al., "ImageNet: A Large-scale hierarchical image database" CVPR, 2009, 8 pages.
Duan et al., "Fast reinforcement learning via slow reinforcement learning" arXiv, 2016, 14 pages.

Elfes, "Sonar-based real-world mapping and navigation" IEEE Journal on Robotics and Automation, 3(3):249-265, 1987, 13 pages.
Elfes, "Using occupancy grids for mobile robot perception and navigation" Computer, 22(6):46-57, 1989, 12 pages.
Fraundorfer et al., "Vision-based autonomous mapping and exploration using a quadrotor MAV" IEEE/RSJ International Conference on Intelligent Robots and Systems, pp. 4557-4564, 2012, 8 pages.
Fuentes-Pacheco et al., "Visual simultaneous localization and mapping: a suvey" Artificial Intelligence Review, 43(1), 2015, 33 pages.
Giusti et al., "A machine learning approach to visual perception of forest trails for mobile robots" IEEE Robotics and Automation Letters, 1(2):661-667, 2016, 7 pages.
Gu et al., "Continuous deep q-learning with model-based acceleration" arXiv, 2016, 10 pages.
Gupta et al., "Cognitive Mapping and Planning for Visual Navigation" arXiv, 2017, 17 pages.
Gupta et al., "Cross modal distillation for supervision transfer" The IEEE Conference on Computer Vision and Pattern Recognition, 2016, 10 pages.
Gupta et al., "Perceptual organization and recognition of indoor scenes from RGB-D images" CVPR, 2013, 8 pages.
Haarnoja et al., "Learning discriminative deterministic state estimators" arXiv, 2016, 9 pages.
Hadsell et al., "Learning long-range vision for autonomous off-road driving" Journal of Field Robotics, 26(2):120-144, 2009, 31 pages.
He et al., "Deep residual learning for image recognition" arXiv, 2015, 12 pages.
He et al., "Identity mappings in deep residual networks" arXiv, 2016, 15 pages.
Heess et al., "Memory-based control with recurrent neural networks" arXiv, 2015, 11 pages.
Henry et al., "RBG-D mapping: Using depth cameras for dense 3D modeling of indoor enviroments" In the 12th International Symposium on Experimental Robotics, 2010, 15 pages.
Hochreiter et al., "Long short-term memory" Neural computation, 9(8): 1735-1780, 1997, 32 pages.
Ioffe et al., Batch normalization: Accelerating deep network training by reducing internaJ covariate shift arXiv, 2015, 9 pages.
Izadi et al., "KinectFusion: reaJ-time 3D reconstruction and interaction using a moving depth camera" Paper Session: 3D, 2011, 10 pages.
Jaderberg et al, "Spatial Transformer Networks" NIPS, 2015, 9 pages.
Jaderberg et al., "Spatial transformer networks" Advances in Neural Infonnation Processing Systems, pp. 2017-2025, 2015, 9 pages.
Kahn et al., "Plato: Policy learning using adaptive trajectory optimization" arXiv, 2016, 8 pages.
Khatib, "Real-time obstacle avoidance for manipulators and mobile robots" International Journal of Robotics Research, 5(1):90-98, 1986, 9 pages.
Kim et al., "Autonomous helicopter flight via reinforcement learning" Advances in neural information processing systems, 2003, 8 pages.
Kingma et al., "Adam: A method for stochastic optimization" arXiv, 2014, 15 pages.
Kohl et al., "Policy gradient reinforcement learning for fast quadrupedal locomotion" Robotics and Automation, 2004, 6 pages.
Konolife et al., "View-based maps" International Journal of Robotics Research, 2010, 8 pages.
Koppula et al., "Semantic labeling of 3D point clouds for indoor scenes" NIPS, 2011, 9 pages.
Kuipers et al., "A robot exploration and mapping strategy based on a semantic hierarchy of spatial representations" Robotics and autonomous systems, 8(1):47-63, 1991, 23 pages.
Kuipers, "The spatial semantic hierarchy" Artificial Intelligence, 119(1):191-233, 2000, 43 pages.
LaValle et al., "Rapidly-exploring random trees: Progress and prospects" Algorithmic and Computatuinal Robotics: New Directions, 2000, 19 pages.
LaValle, "Planning Algorithms" Cambride University Press, 2006, 1023 pages.

(56) References Cited

OTHER PUBLICATIONS

Levine et al., End-to-end training of deep visuomotor policies. Journal of Machine Learning Research, 17(39): 1-40, 2016, 40 pages.
Lowe, "Distinctive image features from scale-invariant keypoints" IJCV, 2004, 28 pages.
Matterport.com [online], retrieved on Sep. 19, 2019, retrieved from URL: <https://matterport.com/>, 5 pages.
Mirowski et al., "Learning to navigate in complex environments" arXiv, 2016, 16 pages.
Mnih et al., "Asynchronous methods for deep reinforcement learning" arXiv, 2016, 19 pages.
Mnih et al., "Human-level control through deep reinforcement learning" Nature, 518(7540):529-533, 2015, 13 pages.
Nister et al., "Visual odometry" Computer Vision and Pattern Recognition, 2004, 35 pages.
Oh et al., "Control of memory, active perception, and action in minecraft" arXiv, 2016, 10 pages.
Patraucean et al, "Spatio-temporal video autoencoder with differentiable memory" arXiv, Sep. 2016, 13 pages.
PCT International Preliminary Report on Patentability in International Application No. PCT/US2018/017666, dated Apr. 13, 2018, 7 pages.
PCT International Search Report and Written Opinion in International Application No. PCT/US2018/017666, dated Apr. 13, 2018.
Peters et al., "Reinforcement learning of motor skills with policy gradients" Neural networks, 21(4):682-697, 2008, 16 pages.
Ross et al., "A reduction of imitation learning and structured prediction to no-regret online learning" AISTATS, vol. 1, p. 6, 2011, 9 pages.
Sadeghi et al., "(CAD)2RL: Real singel-image flight without a singel real image" arXiv, 2016, 12 pages.
Schulman et al., "Trust region policy optimization" CoRR, 2015, 16 pages.
Seitz et al., "A comparison and evaluation of multi-view stereo reconstruction algorithms" IEEE Computer Society Conference on Computer Vision and Pattern Recognition, vol. 1, pp. 519-528, 2006, 8 pages.
Tamar et al., "Value iteration networks" arXiv, 2016, 9 pages.
Thrun et al., "Probabilistic robotics" MIT press, 2005, 492 pages.
Tolman, "Cognitive maps in rats and men" Psychological review, 55(4):189, 1948, 20 pages.
Toussaint, "Learning a world model and planning with a self-organizing, dynamic neural system" NIPS, 2003, 8 pages.
Wierstra et al., "Recurrent policy gradients" Logic Journal of IGPL, 18(5):620-634, 2010, 19 pages.
Zamir et al., "Generic 3d representation via pose estimation and matching" European Conference on Computer Vision, pp. 535-553, 2016, 18 pages.
Zhang et al., "Deep reinforcement learning with successor features for navigation across similar environments" arXiv, 2016, 8 pages.
Zhang et al., "Learning deep neural network policies with continuous memory states" IEEE International Conference on Robotics and Automation, pp. 520-527, 2016, 4 pages.
Zhu et al, "Target-driven Visual Navigation in Indoor Scenes using Deep Reinforcement Learning" arXiv, Nov. 2016, 8 pages.
Zhu et al., "Target-driven visual navigation in indoor scenes using deep reinforcement learning" arXiv, 2016, 8 pages.
JP Office Action in Japanese Application No. 2019-543104, dated Aug. 5, 2020, 13 pages (with English translation).
KR Office Action in Korean Application No. 10-2019-7023399, dated Oct. 29, 2020, 13 pages (with English translation).

* cited by examiner

AGENT NAVIGATION USING VISUAL INPUTS

BACKGROUND

This specification relates to agent navigation through an environment.

Navigating agents, e.g., robots, through an environment using visual inputs requires processing the visual inputs to extract information about the environment and choosing an appropriate action given the extracted information about the environment. Some systems select actions to be performed by the agent using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification generally describes a navigation system that controls an agent navigating through the environment, i.e., that selects actions to be performed by the agent and then causes the agent to perform the selected actions.

In one innovative aspect of the described subject matter, a system comprising one or more computers and one or more storage devices stores instructions that when executed cause the one or more computers to implement: a mapping subsystem configured to, at each time step of a plurality of time steps, generate a characterization of an environment from an image of the environment at the time step, wherein the characterization comprises an environment map identifying locations in the environment having a particular characteristic, and wherein generating the characterization comprises, for each time step: obtaining the image of the environment at the time step, processing the image to generate a first initial characterization of the environment for the time step, obtaining a final characterization of the environment for a previous time step preceding the time step, processing the characterization of the environment for the previous time step to generate a second initial characterization of the environment for the time step, and combining the first initial characterization and the second initial characterization to generate a final characterization of the environment for the time step.

In some implementations, processing the image to generate the first initial characterization comprises: processing the image using a neural network to generate the first initial characterization.

In some implementations, the image is an image captured by an agent moving through the environment, and wherein processing the final characterization of the environment for the previous time step to generate the second initial characterization of the environment for the time step comprises: obtaining a measure of movement of the agent between the previous time step and the time step, and applying a warping function to the final characterization of the environment for the previous time step and the measure of movement to generate the second initial characterization.

In some implementations, the warping function is a function that performs interpolation using bilinear sampling.

In some implementations, the image is captured by an agent moving through the environment, the image is from an ego-centric perspective of the agent, and the first initial characterization, the second initial characterization, the final characterization for the previous time step, and the final characterization for the time step are from a top-down perspective.

In some implementations, combining the first initial characterization and the second initial characterization to generate the final characterization for the time step comprises: applying an update function to the first initial characterization and the second initial characterization to generate the final characterization.

In some implementations, each characterization includes: (i) a set of scores representing whether or not the plurality of locations in the environment have the particular characteristic, and (ii) a set of measures of confidence in the set of scores, the update function comprises performing operations of the following equations:

$$f_t = \frac{f_{t-1} c_{t-1} + f'_t c'_t}{c_{t-1} + c'_t}$$

$$c_t = c_{t-1} + c'_t,$$

wherein ft is the set of scores for the final characterization for the time step, ct is the set of measures of confidence in the set of scores for the final characterization for the time step, f_t'' is the set of scores for the first initial characterization, c_t'' is the set of measures of confidence in the set of scores for the first initial characterization, ft−1 is the set of scores for the second initial characterization, and ct−1 is the set of measures of confidence in the set of scores for the second initial characterization.

In some implementations, the update function is performed by a recurrent neural network, and wherein the recurrent neural network is configured to, for each time step of the plurality of time steps, process the first initial characterization and the second initial characterization for the time step to generate the final characterization for the time step.

In some implementations, the environment map for a time step comprises, for each of the plurality of locations in the environment: a score representing whether or not the location has the particular characteristic, and the characterization further comprises, for each of the locations, a measure of confidence in the score for the location.

In some implementations, the system further comprises, for each of the plurality of time steps: obtaining the final characterization for the time step from the mapping subsystem, and processing the final characterization to select a proposed action to be performed by an agent interacting with the environment at the time step.

In another innovative aspect, the system includes a planning subsystem configured to, for each time step of a plurality of time steps, obtain a final characterization of an environment of an agent performing actions to accomplish a goal for the time step, wherein the final characterization of the environment of the agent comprises an environment map identifying locations in the environment having a particular characteristic; generate a sequence of spatially scaled environment maps from the final characterization, wherein each spatially scaled environment map in the sequence is downsampled relative to any subsequent spatially scaled environment map in the sequence; for each spatially scaled environment map in the sequence starting with the most downsampled spatially scaled environment map, process the spatially scaled environment map and one or more inputs associated with the spatially scaled environment map to generate one or more value maps for the spatially scaled environment map in the sequence, wherein a value map includes, for each region of a plurality of regions in the spatially scaled environment map, an estimate of value of the agent being in the region to accomplishing the goal, and for each spatially scaled environment map in the sequence other than a last spatially scaled environment map, provide the one or more updated value maps for the spatially scaled environment map as an input associated with a subsequent spatially scaled environment map in the sequence; and select the proposed action based on the updated value maps for the last spatially scaled environment map in the sequence.

In some implementations, the inputs associated with each spatially scaled environment map in the sequence include data identifying the goal for the agent.

In some implementations, the goal is a location in the environment that the agent tries to reach.

In some implementations, the goal is an object in the environment that the agent tries to locate.

In some implementations, the inputs to the most downsampled spatially scaled environment map include the final characterization for the time step.

In some implementations, processing inputs associated with the spatially scaled environment map to generate the one or more value maps for the spatially scaled environment map comprises: processing inputs associated with the spatially scaled environment map to generate one or more initial value maps for the spatially scaled environment map; and performing one or more value iterations on the one or more initial value maps for the spatially scaled environment map to generate the one or more value maps for the spatially scaled environment map.

In some implementations, selecting the proposed action based on the value maps for the last spatially scaled environment map in the sequence comprises: determining, from the updated value maps for the last spatially scaled environment map in the sequence, a particular region of the updated value maps having a highest estimate of value; and selecting an action that takes the agent to the particular region as the proposed action for the time step.

In some implementations, selecting the proposed action based on the value maps for the last spatially scaled environment map in the sequence comprises: processing the value maps through a neural network including one or more rectified linear units to select the proposed action.

Particular embodiments of the subject matter described in this specification can be implemented so as to realize one or more of the following advantages.

Systems for navigating an agent in an environment including mapping and planning subsystems can be trained end-to-end, which can increase the efficiency and accuracy of such systems after they are trained. That is, because the operations performed by the mapper and the planner are entirely differentiable, the mapper can be trained by back-propagating errors from the planner. For example, a planning subsystem can learn how to use environment maps generated by a mapping subsystem while the mapping subsystem is learning how to generate better environment maps. Action planning for an agent can be made more computationally efficient by spatially scaling environment maps to minimize value iteration precision for more downsampled spatially scaled environment maps while still generating highly accurate action plans.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
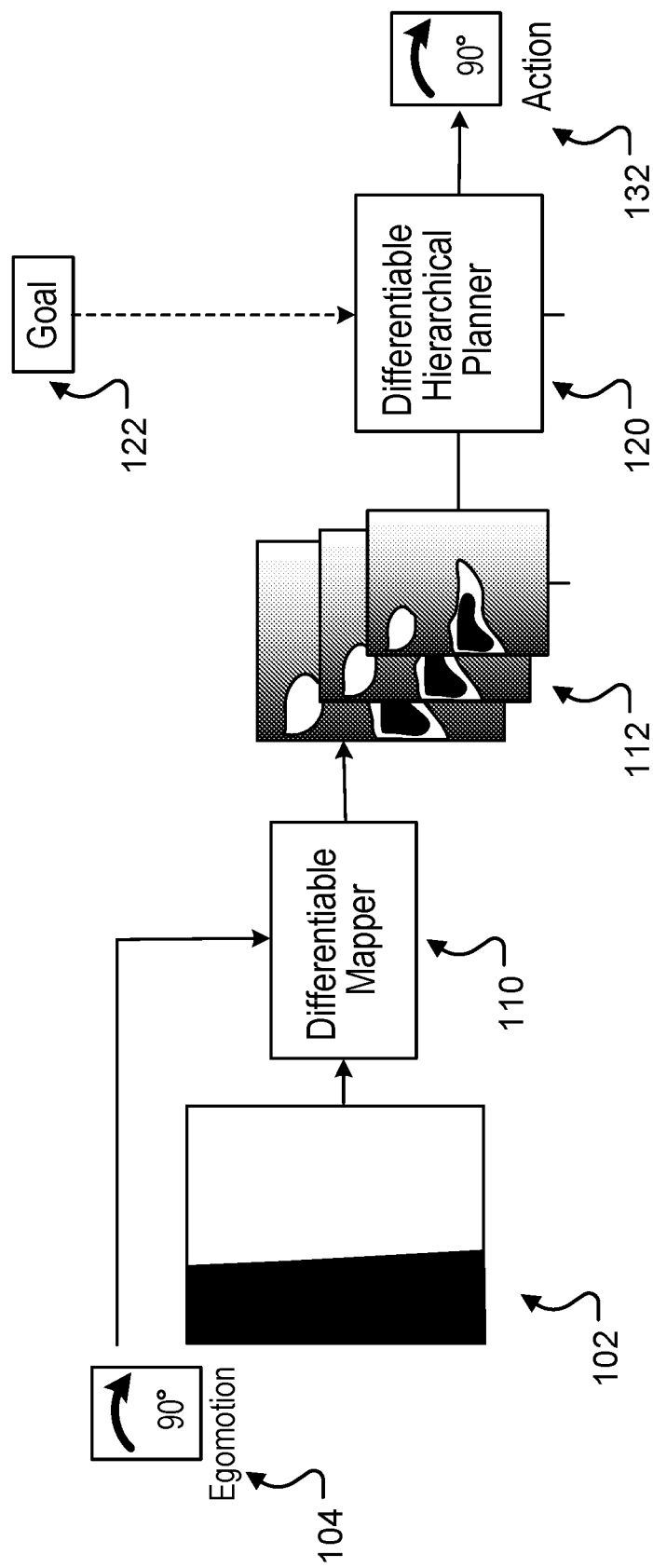
FIG. 1 shows an example navigation system.

FIG. 1 shows an example navigation system 100. The navigation system 100 is an example of a system implemented as computer programs on one or more computers in one or more locations, in which the systems, components, and techniques described below can be implemented.

The navigation system 100 controls an agent as the agent moves through an environment by receiving images of the environment and selecting actions to be performed by the agent in response to the received images.

Generally, the environment is a real-world environment and the agent is a mechanical agent interacting with the real-world environment to accomplish a goal. For example, the agent may be a robot interacting with the environment to accomplish a specific goal, e.g., to move to a particular location in the environment or to locate a particular object in the environment. As another example, the agent may be an autonomous or semi-autonomous vehicle navigating through the environment to accomplish a goal, i.e., navigating to a particular location.

In particular, the navigation system 100 repeatedly receives images of the environment and, in response to each image, selects an action to be performed by the agent from a set of possible actions and causes the agent to perform the selected action. Each iteration of receiving an image and then performing an action in response to the image will be referred to in this specification as a time step. By repeatedly selecting actions in this manner, the system 100 causes the agent to accomplish the goal.

Generally, the received images are images captured by the agent as the agent moves through the environment, i.e., images captured by a camera or other sensor of the agent. Thus, the images are first-person images of the environment with respect to the agent.

For example, at a given time step, the system 100 receives an image 102 of the environment and data identifying the egomotion 104 of the agent relative to the previous time step. The egomotion 104 is a measure of movement of the agent between the previous time step and the time step, i.e., a measure that indicates how the position of the agent changed relative to the previous time step.

The system 100 then selects an action 132 for the time step using the image 102, the egomotion 104, and data identifying the goal 122 that the agent is attempting to reach and causes the agent to perform the action 132, i.e., by instructing the control system of the agent to submit a particular control input corresponding to the action 132. That is, the actions are control inputs for the agent that cause the agent to move through the environment.

In particular, the system 100 includes a differentiable mapper 110 and a differentiable hierarchical planner 120.

As will be seen from the description below, the mapper 110 and the planner 120 are referred to as "differentiable" because the operations performed by each of these subsystems while selecting an action in response to a given image are entirely differentiable. This allows the system 100 to train the mapper 110 and the planner 120 end-to-end, improving the performance of the trained system. Training the mapper 110 and the planner 120 will be described in more detail below with reference to FIG. 4.

At each time step, the mapper 110 receives the image 102 and the egomotion 104 for the time step and generates a characterization 112 of the environment.

The characterization 112 generally includes belief data and confidence data.

The belief data is a map of the environment that identifies locations in the environment that have some characteristic that will be useful to the planner 120. In particular, because of the way that the mapper 110 is trained, the particular characteristic is learned rather than pre-determined. That is, the map amounts to a latent representation of the environment because the mapper is trained by backpropagating errors from the planner 120. Since, as will be described below, the map is fed directly into the learned planner 120, the map need not encode a pre-determined characteristic of the environment, but can instead function as a general spatial memory that is used by the planner 120, i.e., as a memory that encodes some characteristic of the various locations in the environment.

More specifically, the map is from a top-down view of the environment and includes, for each of multiple locations in the top-down view, a respective score that indicates how likely it is that the location has the particular characteristic.

The confidence data is data that identifies how confident the mapper 110 is that the belief data is accurate. For example, the confidence data can include, for each of the locations in the map, a confidence score that represents how confident the mapper 110 is in the likelihood for the location.

The mapper 110 and generating a characterization will be described in more detail below with reference to FIG. 2.

The planner 120 receives the characterization 112 and selects the action 132 to be performed by the agent in order for the agent to achieve the goal 122 based on the characterization 112. Generally, the planner 120 performs value iteration at multiple scales using the characterization 112 to select the action to be performed by the agent. The planner 120 and selecting an action based on a characterization will be described in more detail below with reference to FIG. 3.

The system 100 then causes the agent to perform the selected action 132. Generally, the selected action 132 is a control input for the agent and the system causes the agent to perform the selected action 132 by submitting the control input directly to the agent or by instructing a control system for the agent to instruct the agent accordingly.

Figure 2:
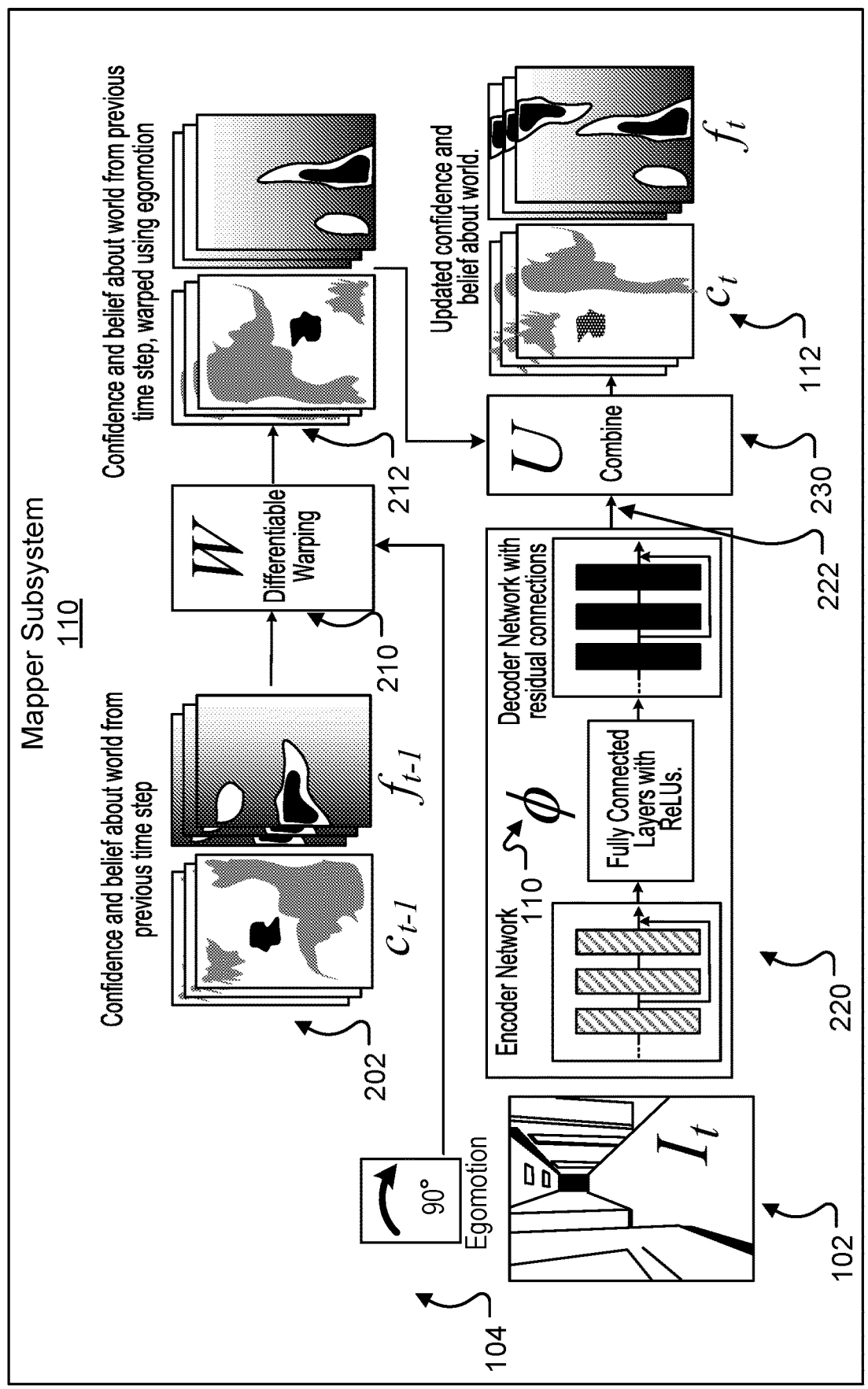
FIG. 2 shows an example architecture of the differentiable mapper.

FIG. 2 shows an example architecture of the differentiable planner 110.

To generate a final characterization 112 for a given time step, the planner 110 processes the image 102 and the egomotion 104 to generate two initial characterizations for the time step. Like the final characterization, the two initial characterizations each include both belief data and confidence data, but with likely different scores and confidences than the final characterization. The planner 110 then combines the two initial characterizations to generate the final characterization 112.

In particular, the planner processes the image 102 using a neural network 220 to generate a first initial characterization 222 of the environment for the time step. As can be seen from FIG. 2, the neural network 220 includes a convolutional encoder which uses residual connections and produces a representation of the scene in the image 102 in the two-dimensional (2D) image space. This representation is transformed into one that is in the egocentric 2D top-down view via fully connected layers. This top-down view representation is up-sampled using up-convolutional layers (also with residual connections) to obtain the first initial characterization.

The planner 110 also processes the final characterization 202 from the previous time step using the egomotion 104 to generate a second initial characterization 212 for the time step.

More specifically, the planner 110 applies a differentiable warping function 212 to the final characterization 202 from the previous time step and the egomotion 104 to generate the second initial characterization 212. The warping function can be any function that warps the final characterization 202 from the previous time step in a differentiable manner.

For example, the warping function can be a function that is realized using bilinear sampling. In particular, given the ego-motion, the system can compute a backward flow field that maps each pixel in the second initial characterization 212 to the location in the final characterization 202 where it should come from. This backward flow can be analytically computed from the ego-motion. The function can then use bi-linear sampling to apply this flow field to the final characterization 202 to generate the second initial characterization 212.

The planner 110 then combines the first initial characterization 222 and the second initial characterization 212 to generate the final characterization 112 of the environment for the time step.

More specifically, the planner 110 applies a combining function 230 to combine the first initial characterization 222 and the second characterization 212 to generate the final characterization 112 for the time step.

In some implementations, the combining function 230 is an analytic function. In particular, the update function can be expressed as follows:

$$f_t = \frac{f_{t-1} c_{t-1} + f'_t c'_t}{c_{t-1} + c'_t}$$

-continued $$c_t = c_{t-1} + c'_t,$$

where $f_t$ is the set of scores in the belief data for the final characterization for the time step, $c_t$ is the set of measures of confidence in the confidence data for the final characterization for the time step, $f'_t$ is the set of scores for the first initial characterization, $c'_t$ is the set of measures of confidence in the first initial characterization, $ft_{t-1}$ is the set of scores for the second initial characterization, and $c_{t-1}$ is the set of measures of confidence in the set of scores for the second initial characterization.

In some other implementations, the combining function 230 is realized by a neural network, e.g., a recurrent neural network like a long short-term memory (LSTM) neural network.

As can be seen from this description, each operation performed by the planner 110 on the image 102, the ego-motion 104, and the final characterization 202 is a differentiable operation, i.e., either a neural network operation or a differentiable analytic function.

Once the planner 110 has generated the final characterization 112, the planner 110 provides the final characterization 112 to the mapper 120 for use in selecting the action at the time step.

Figure 3:
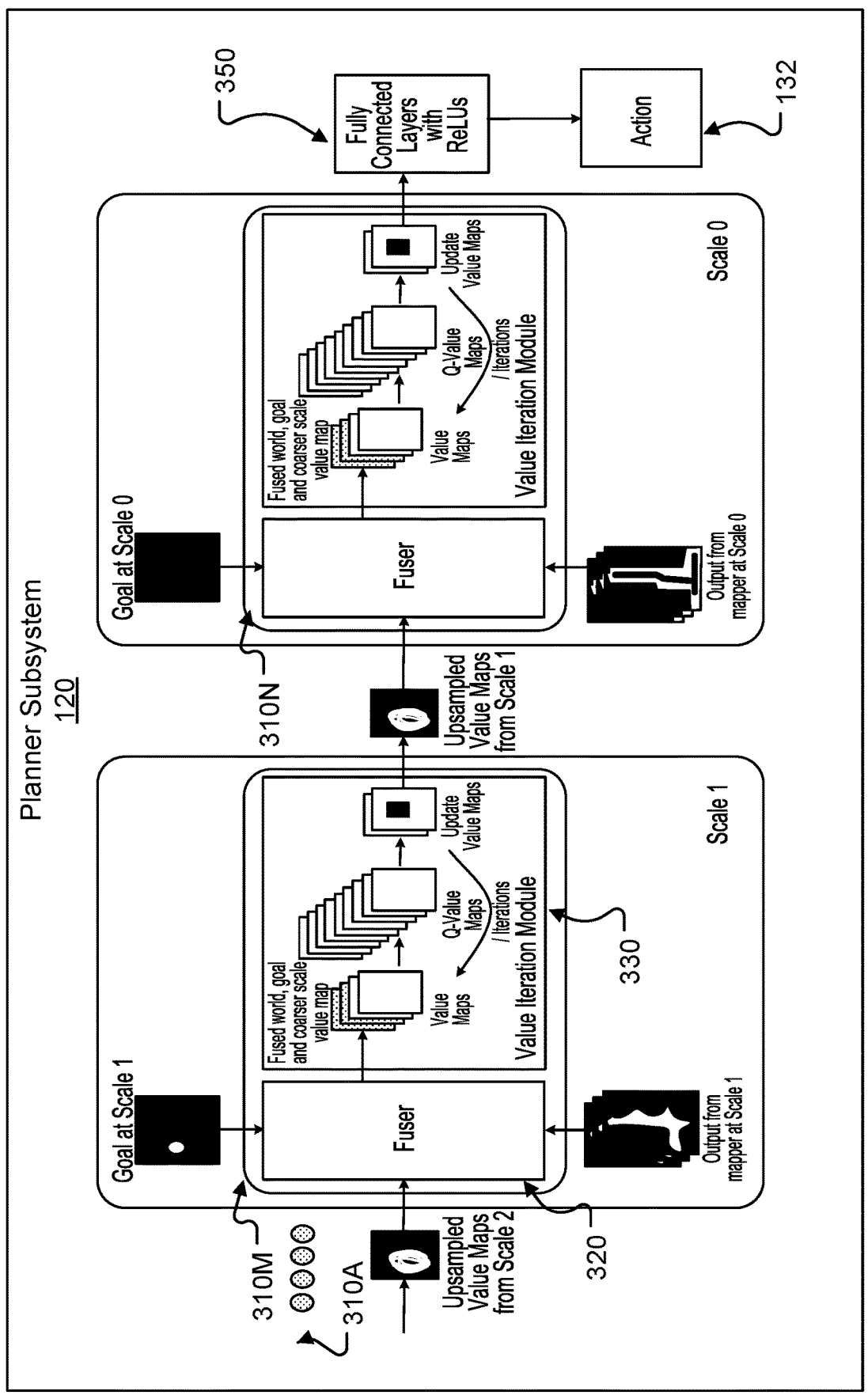
FIG. 3 shows an example architecture of the differentiable hierarchical planner.

FIG. 3 shows an example architecture of the differentiable hierarchical planner 120.

Generally, the hierarchical planner 120 plans at multiple spatial scales. In particular, the hierarchical planner 120 includes a respective value subsystem 310A-N for each of the multiple spatial scales. While only value subsystems 310M and 310N are shown in the example, the planner 120 will generally include more than two value subsystems.

The first value subsystem 310A of the subsystems 310A-N corresponds to a k times spatially downsampled map and the last value subsystem 310N corresponds to the original resolution, i.e., the resolution of the map received from the mapper 110.

Each value subsystem conducts/value iterations at the corresponding spatial scale to generate one or more value maps that are at the corresponding spatial scale. A value map includes, for each region of a plurality of regions in the spatially scaled environment map corresponding to the spatial scale, an estimate of the value of the agent being in the region to accomplishing the goal, i.e., an estimate of how valuable the agent being in the corresponding region would be to accomplishing the goal.

The planner 120 then center crops and upsamples the one or more value maps and uses the center cropped and upsampled output for doing value iterations at a finer scale, i.e., by providing the center cropped and upsampled output as input to the next value subsystem. The planner 120 repeats this process multiple times, i.e., once for each value subsystem, to reach the resolution of the original problem.

Once the last value subsystem 310N has generated the one or more value maps that are at the same scale as the environment map received from the mapper 110, the planner 120 uses these value maps to select the action to be performed by the agent 132. In the example of FIG. 3, the planner 120 processes these value maps using a set of fully connected layers with rectified liner unit activation functions to generate a score distribution over possible actions to be performed by the agent and then selects the action 132 from the score distribution. In other examples, the planner 120 can determine, from the last value maps, a particular region of the updated value maps that is reachable from the current position of the agent and that has the highest estimate of value and then select the action that takes the agent to the particular region as the proposed action 132 for the time step.

More specifically, the planner 120 receives the final characterization 112 for the time step and generates a sequence of spatially scaled environment maps from the final characterization, with each spatially scaled environment map in the sequence being downsampled relative to any subsequent spatially scaled environment map in the sequence and corresponding to a different one of the value subsystems 310A-N.

For a given spatial scale, the value subsystem for that scale processes (i) the spatially scaled environment map of the corresponding scale and (ii) one or more inputs associated with the spatially scaled environment map to generate one or more value maps for the spatially scaled environment map.

The inputs associated with the spatially scaled environment map generally include the one or more value maps for the previous spatial scale in the sequence and data identifying the goal for the agent. That is, each value subsystem other than the last value subsystem in the sequence provides the one or more value maps generated by the value subsystem as an input associated with a subsequent spatially scaled environment map in the sequence, i.e., as input to the next value subsystem in the sequence. For the first value subsystem in the sequence, i.e., the most downsampled value subsystem, the value maps can be one or more predetermined initial value maps.

When the goal is a location, the data identifying the goal that is input to a given value subsystem can be a map that is at the same scale as the subsystem. Thus, for fine scales, when the agent is far from the goal, the goal may not be visible in the data that is provided as input to the corresponding subsystem.

Each value subsystem includes a fuser 320 and a value iteration module 330.

The fuser 320 combines (i) the spatially scaled environment map of the corresponding scale and (ii) the one or more inputs associated with the spatially scaled environment map to generate a value iteration input that includes the one or more value maps that are at the same scale as the spatially scaled environment map. In particular, the fuser 320 center crops and upsamples the one or more value maps from the previous value subsystem and depth concatenates the goal data, the spatially scaled environment map, and the cropped and upsampled value maps to generate the value iteration input The value iteration module 330 then performs, using a value iteration neural network, $l$ value iterations on the value iteration input, i.e., on the one or more initial value maps, to generate the one or more value maps for the spatially scaled environment map. Value iteration can be thought of as a generalization of Dijkstra's algorithm, where the value of each state is iteratively recalculated at each iteration by taking a max over the values of its neighbors plus the reward of the transition to those neighboring states. The value iteration neural network that performs the value iterations is a neural network with alternating convolutions and channel-wise max pooling operations, allowing the planner 120 to be differentiated with respect to its inputs. Value iterations and value iteration neural networks are described in more detail in A. Tamar, S. Levine, and P. Abbeel. *Value iteration networks*. In NIPS, 2016.

Figure 4:
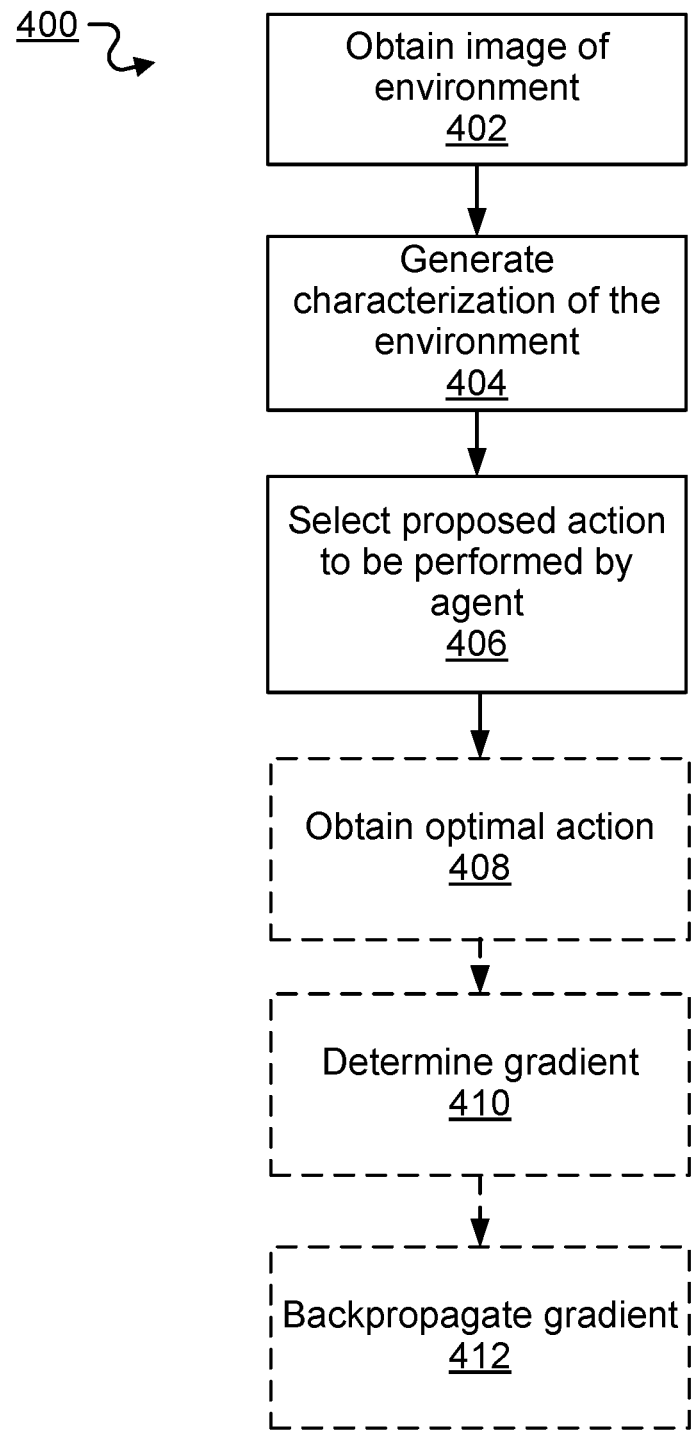
FIG. 4 is a flow diagram of an example process for processing an image at a given time step.

FIG. 4 is a flow diagram of an example process 400 for processing an image at a given time step. For convenience, the process 400 will be described as being performed by a system of one or more computers located in one or more locations. For example, a navigation system, e.g., the navigation system 100 of FIG. 1, appropriately programmed, can perform the process 400.

The system obtains an image of the environment (step 402), i.e., an image captured by a sensor of the agent while the agent is moving through the environment. The system also receives data identifying the egomotion of the agent from a previous time step.

The system generates a characterization of the environment (step 404) from the image and the egomotion. The characterization includes belief data and confidence data. That is, the characterization includes a top-down map of the environment with scores at each location in the map and confidence measures for the scores.

The system selects a proposed action to be performed by the agent (step 406). In particular, the system performs value iterations at multiple spatial scales using data identifying the goal of the agent and the characterization of the environment to generate one or more final value maps. The system then uses the one or more final value maps to select the proposed action to be performed by the agent.

If the process 400 is being performed during the training of the planner and the mapper, the system obtains an optimal action, i.e., the action that should have been performed by the agent (step 408).

The system determines a gradient of a measure of error between the selected action and the optimal action (step 410).

The system backpropagates the gradient through the planner and the mapper to determine updates to the parameters of the mapper and the planner (step 412). Thus, the system trains the mapper and the planner end-to-end, i.e., errors in proposed actions during training result in updates not only to the parameters of the planner, but also to parameters of the mapper. In particular, in some implementations, the errors in proposed actions are the only feedback used to adjust the parameters of the mapper, so that the mapper learns to generate maps that are useful for the planner in selecting the correct action without needing any extra supervision. In particular, there are no external labels that specify what the particular characteristic in the belief data generated by the mapper should be, allowing the mapper to learn a characteristic that is useful to the planner.

If the process 400 is being performed after training, the system can cause the agent to perform the proposed action. If the process 400 is being performed during training, the system can cause the agent moving through the environment to perform the proposed action with probability p and the optimal action with probability 1-p. This allows the agent to explore the environment and to potentially discover actions that would lead to improved performance in accomplishing the goal. In some cases, the system increases p during operation of the agent to anneal the probability of selecting the optimal action.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that when executed cause the one or more computers to implement:
a mapping subsystem configured to, at each time step of a plurality of time steps, generate a characterization of an environment from an image of the environment at the time step, wherein the characterization comprises an environment map identifying locations in the environment having a particular characteristic, wherein the image of the environment is captured by an agent moving through the environment and is captured from a first-person ego-centric perspective of the agent, wherein the environment map is from a top-down view of the environment, and wherein the particular characteristic is a latent characteristic that is learned during joint training of the mapping subsystem with a planning subsystem that plans actions to be performed by the agent using characterizations generated by the mapping subsystem and wherein generating the characterization comprises, for each time step:
obtaining the image of the environment at the time step that is captured from the first-person ego-centric perspective of the agent,
processing the image using a neural network to generate a first initial characterization of the environment for the time step, wherein the neural network is configured to receive the image in the first-person ego-centric perspective of the agent and to transform the image in the first-person ego-centric perspective into a first initial characterization of the environment that includes a first environment map that is from the top-down view of the environment,
obtaining a final characterization of the environment for a previous time step preceding the time step, wherein the final characterization of the environment for the previous time step includes a final environment map from the previous time step that is from the top-down view of the environment,
obtaining a measure of movement of the agent between the previous time step and the time step,
processing the characterization of the environment for the previous time step to generate a second initial characterization of the environment for the time step, comprising applying a differentiable warping function to the final characterization of the environment for the previous time step and the measure of movement to generate the second initial characterization, wherein the second initial characterization includes a second environment map that is from the top-down view of the environment; and
combining the first initial characterization and the second initial characterization to generate a final characterization of the environment for the time step.

2. The system of claim 1, wherein the warping function is a function that performs interpolation using bilinear sampling.

3. The system of claim 1, wherein:
the top-down view of the environment is an ego-centric top down perspective that is centered at a current position of the agent.

4. The system of claim 1, wherein combining the first initial characterization and the second initial characterization to generate the final characterization for the time step comprises:
applying an update function to the first initial characterization and the second initial characterization to generate the final characterization.

5. The system of claim 4, wherein:
each characterization includes: (i) a set of scores representing whether or not the plurality of locations in the environment have the particular characteristic, and (ii) a set of measures of confidence in the set of scores,
the update function comprises performing operations of the following equations:

$$f_t = \frac{f_{t-1}c_{t-1} + f'_t c'_t}{c_{t-1} + c'_t}$$
$$c_t = c_{t-1} + c'_t,$$

wherein $f_t$ is the set of scores for the final characterization for the time step, $c_t$ is the set of measures of confidence in the set of scores for the final characterization for the time step, $f'_t$ is the set of scores for the first initial characterization, $c'_t$ is the set of measures of confidence in the set of scores for the first initial characterization, $ft_{t-1}$ is the set of scores for the second initial characterization, and $c_{t-1}$ is the set of measures of confidence in the set of scores for the second initial characterization.

6. The system of claim 4, wherein the update function is performed by a recurrent neural network, and wherein the recurrent neural network is configured to, for each time step of the plurality of time steps, process the first initial characterization and the second initial characterization for the time step to generate the final characterization for the time step.

7. The system of claim 1, wherein the environment map for a time step comprises, for each of the plurality of locations in the environment:
a score representing whether or not the location has the particular characteristic, and the characterization further comprises, for each of the locations,
a measure of confidence in the score for the location.

8. The system of claim 1, further comprising:
the planning subsystem, wherein the planning system is configured to, for each of the plurality of time steps:
obtain the final characterization for the time step from the mapping subsystem, and
process the final characterization to select a proposed action to be performed by an agent interacting with the environment at the time step.

9. The system of claim 8, wherein the agent is performing actions to accomplish a goal, and wherein processing the final characterization to select the proposed action for the time step comprises:
generating a sequence of spatially scaled environment maps from the final characterization for the time step, wherein each spatially scaled environment map in the sequence is downsampled relative to any subsequent spatially scaled environment map in the sequence; and
for each spatially scaled environment map in the sequence starting with the most downsampled spatially scaled environment map,
processing the spatially scaled environment map and one or more inputs associated with the spatially scaled environment map to generate one or more value maps for the spatially scaled environment map, wherein a value map includes, for each region of a plurality of regions in the spatially scaled environment map, an estimate of value of the agent being in the region to accomplishing the goal, and for each spatially scaled environment map in the sequence other than a last spatially scaled environment map, providing the one or more value maps for the spatially scaled environment map as an input associated with a subsequent spatially scaled environment map in the sequence.

10. The system of claim 9, wherein the inputs associated with each spatially scaled environment map in the sequence include data identifying the goal for the agent.

11. The system of claim 10, wherein the goal is a location in the environment that the agent tries to reach.

12. The system of claim 10, wherein the goal is an object in the environment that the agent tries to locate.

13. The system of claim 9, wherein the inputs to the most downsampled spatially scaled environment map include the final characterization for the time step.

14. The system of claim 9, wherein processing inputs associated with the spatially scaled environment map to generate the one or more value maps for the spatially scaled environment map comprises:
processing inputs associated with the spatially scaled environment map to generate one or more initial value maps for the spatially scaled environment map; and
performing one or more value iterations on the one or more initial value maps for the spatially scaled environment map to generate the one or more value maps for the spatially scaled environment map.

15. The system of claim 9, wherein processing the final characterization to select the proposed actions comprises:
selecting the proposed action based on the value maps for the last spatially scaled environment map in the sequence.

16. The system of claim 15, wherein selecting the proposed action based on the value maps for the last spatially scaled environment map in the sequence comprises:
determining, from the value maps for the last spatially scaled environment map in the sequence, a particular region of the updated value maps having a highest estimate of value; and
selecting an action that takes the agent to the particular region as the proposed action for the time step.

17. The system of claim 15, wherein selecting the proposed action based on the value maps for the last spatially scaled environment map in the sequence comprises:
processing the value maps through a neural network including one or more rectified linear units to select the proposed action.

18. A method of training a system comprising a mapping subsystem and a planning subsystem, the method comprising, at each of a plurality of time steps:
obtaining an image captured by an agent moving through an environment at the time step;
processing the image using the mapping subsystem to determine a final characterization of an environment at the time step;
processing the final characterization using the planning subsystem to select a proposed action for the time step of the image, wherein the proposed action is an action to be performed by the agent in the environment at the time step;
obtaining an optimal action for the time step of the image;
determining a gradient of a measure of error between the selected action by the planning subsystem and the optimal action; and
updating both (i) proposed actions selected by the planning subsystem and (ii) final characterizations generated by the mapping subsystem based on the measure of error between the selected action by the planning subsystem and the optimal action by backpropagating the gradient through the mapping subsystem and the planning subsystem to determine updates to parameters of the mapping subsystem and the planning subsystem.

19. The method of claim 18, further comprising:
causing an agent moving through the environment to perform the proposed action with probability $\rho$ and the optimal action with probability $1-\rho$.

20. The method of claim 19, further comprising:
increasing $\rho$ during operation of the agent to anneal the probability of selecting the optimal action.

21. A method comprising:
at each time step of a plurality of time steps, generating a characterization of an environment from an image of the environment at the time step, wherein the characterization comprises an environment map identifying locations in the environment having a particular characteristic, wherein the image of the environment is captured by an agent moving through the environment and is captured from a first-person ego-centric perspective of the agent, wherein the environment map is from a top-down view of the environment, and wherein the particular characteristic is a latent characteristic that is learned during joint training of the mapping subsystem with a planning subsystem that plans actions to be performed by the agent using characterizations generated by the mapping subsystem and wherein generating the characterization comprises, for each time step:
obtaining the image of the environment at the time step that is captured from the first-person ego-centric perspective of the agent,
processing the image using a neural network to generate a first initial characterization of the environment for the time step, wherein the neural network is configured to receive the image in the first-person ego-centric perspective of the agent and to transform the image in the first-person ego-centric perspective into a first initial characterization of the environment that includes a first environment map that is from the top-down view of the environment,
obtaining a final characterization of the environment for a previous time step preceding the time step, wherein the final characterization of the environment from the previous time step includes a final environment map from the previous time step that is from the top-down view of the environment,
obtaining a measure of movement of the agent between the previous time step and the time step,
processing the characterization of the environment for the previous time step to generate a second initial characterization of the environment for the time step, comprising applying a differentiable warping function to the final characterization of the environment for the previous time step and the measure of movement to generate the second initial characterization, wherein the second initial characterization includes a second environment map that is from the top-down view of the environment; and combining the first initial characterization and the second initial characterization to generate a final characterization of the environment for the time step.

* * * * *